United States Patent [19]

Alverio

[11] Patent Number: 5,129,188
[45] Date of Patent: Jul. 14, 1992

[54] METHOD OF MANUFACTURING A THREAD CUTTING TOOL WITH WEAR RESISTANT TEETH

[75] Inventor: John Alverio, Shelby Township, Macomb County, Mich.

[73] Assignee: General Motors Corporation, Detroit, Mich.

[21] Appl. No.: 666,979

[22] Filed: Mar. 11, 1991

[51] Int. Cl.⁵ .............................................. B24B 3/18
[52] U.S. Cl. ................................. 51/288; 51/95 TG; 51/326
[58] Field of Search ................. 51/281 R, 287, 288, 51/95 TG, 326

[56] References Cited

U.S. PATENT DOCUMENTS

| | | | |
|---|---|---|---|
| 2,246,865 | 6/1941 | Stimson | 51/288 |
| 3,323,260 | 6/1967 | Oxford | 51/288 |
| 3,743,489 | 7/1973 | Wentorf, Jr. et al. | 51/307 |
| 3,834,090 | 9/1974 | Wasser | 51/288 |
| 4,086,733 | 5/1978 | Vig | 51/288 |

OTHER PUBLICATIONS

Valenite Catalog May 1986, p. 25, "Tooling for the Petroleum Industry".

*Primary Examiner*—Bruce M. Kisliuk
*Assistant Examiner*—Bryan Reichenbach
*Attorney, Agent, or Firm*—Patrick M. Griffin

[57] ABSTRACT

A method is provided for tipping the leading edge of teeth on a thread cutting tool with wear resistant material, without altering the basic size and shape of the tool, and without having to alter the way in which the teeth are cut. A plurality of veins of wear resistant material are hardened in slots in the tool body before axial flutes are cut into the tool body. When the flutes are cut, one side of the veins is exposed, and when the teeth are cut, they are thereby armored by the remainder of the exposed veins.

2 Claims, 1 Drawing Sheet

METHOD OF MANUFACTURING A THREAD CUTTING TOOL WITH WEAR RESISTANT TEETH

This invention relates to thread cutting tools in general, and specifically to a method for manufacturing a thread cutting tool in which the cutting teeth are made more wear resistant than the main body of the tool itself.

BACKGROUND OF THE INVENTION

Tools for cutting threads into the interior surfaces of bores comprise two general types, depending on the relative diameter of the bore. With larger diameter bores, tool design is more flexible. It is possible to use a tool that includes special wear resistant cutting inserts to actually cut the threads. These inserts can be made of a material different than the base material of the tool itself. The main body of the tool is a metal bar that has the requisite toughness and machinability. Mounting an insert to the bar takes radial room, but this is readily available in large diameter bores.

Such a two part design is not possible in tools used to thread smaller diameter holes, which include taps, thread hobs and the like. These generally are made of one solid piece of material, because of space constraints. The cutting teeth are cut from the same material as the main body of the tool itself, although the whole tool may be coated. Typically, such tools are manufactured by machining axial flutes into the cylindrical main body of the tool, which creates a plurality of exposed lands. Then, a pattern of regular cutting teeth is machined across the lands, matching the thread pattern that is desired. No good method exists for tipping these much smaller cutting teeth with a secondary, more wear resistant material.

SUMMARY OF THE INVENTION

The invention provides a practical method of tipping the cutting teeth of a small diameter thread cutting tool.

According to the method of the invention, a number of axially extending slots are first cut into the surface of the cylindrical tool body, one for each flute. Next, a vein of wear resistant material is sintered in place into each vein, filling the slot and bringing the tool body back to its original configuration. Then, the axially extending flutes are machined into the tool body as they would be conventionally, creating the lands across which the teeth will ultimately ground. However, the flutes are machined contiguous to the veins, so that the face of each flute is comprised by the vein along the edge where it intersects the land. Therefore, when the teeth are ground across the lands, the grinding tool cuts through the vein, as well. Teeth are thereby created with leading edges tipped by the remaining portion of the veins.

It is, therefore, a general object of the invention to provide a practical method of tipping the teeth of small bore thread cutting tools with more wear resistant material.

It is another object of the invention of the method to provide such a method in which the flutes and cutting teeth themselves are machined by basically conventional methods.

It is another object of the invention to provide such a method that works within the same size and shape constraints as a conventional tool.

It is still another object of the invention to tip the cutting teeth by first providing veins of wear resistant material in the cutting body contiguous to the flutes, so that the tooth forming operation will leave a layer of the vein material at the leading edge of the teeth.

DESCRIPTION OF THE PREFERRED EMBODIMENT

These and other objects and features of the invention will appear from the following written description, and from the drawings, in which.

Figure 1:
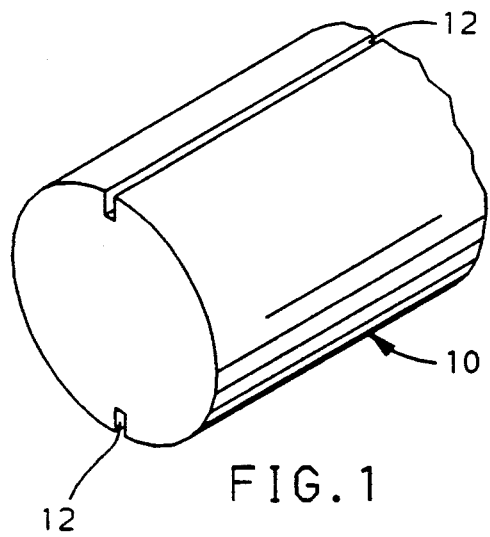
FIG. 1 is a perspective view of the end of a cylindrical tool body after the axial slots have been machined into it.

Referring first to FIG. 1 the basic component of a thread cutting tool made according to the method of the invention is a cylindrical body 10 of high speed steel, solid carbide, or other suitable material. Only the end portion of body 10 is illustrated, as that is sufficient to describe the method. It should be kept in mind that the actual tool would be longer, and would include standard conventional features, such as a squared off shank for attachment to the chuck of a boring machine. A suitable body material will be tough and durable enough to withstand the twisting and bending loads seen during operation, as well as capable of being machined and cut to the necessary shape. It should also be cost effective. The metals noted meet those requirements, while the more wear resistant materials, such as cubic boron nitride or synthetic diamond, do not. However, the primary material of body 10 is not nearly so wear resistant as these secondary materials. The invention provides a practical method of melding the two without a great deal of additional cost.

Figure 2:
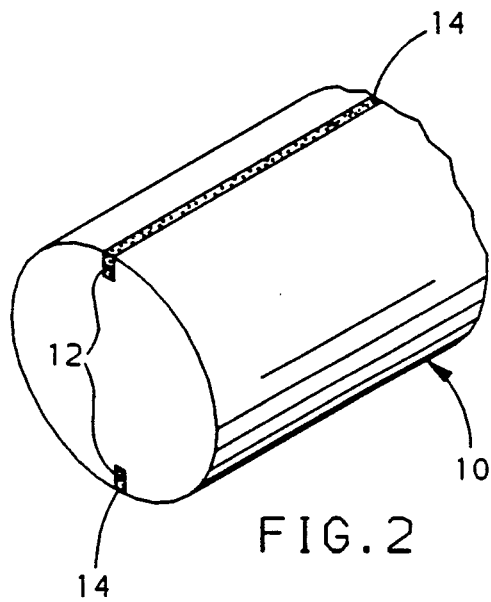
FIG. 2 is a view of the tool body after the veins of wear resistant material have been hardened into the slots.

Referring next to FIGS. 1 and 2, the initial steps in the process are illustrated. First, a pair of diametrically opposed, axially extending slots 12 are cut into the outer surface of body 10. As illustrated, slots 12 are straight, and of generally rectangular cross section, so that the sides thereof are generally flat, with a depth and width dependent on factors described below. The number and shape of the slots 12 is determined by other structural features, described below. Next, the slots 12 are filled with a powder of wear resistant material like that described above, which is hardened in place by a sintering process. Such processes are well known in the art, and the details thereof need not be elaborated here. Suffice to say that the end result is a wear resistant seam or vein 14 that fills in each slot 12, bringing the cylindrical body 10 back substantially to its original configuration. In effect, the vein 14 becomes an integral part of body 10, which may be machined along with it just as it would have been conventionally.

Figure 3:
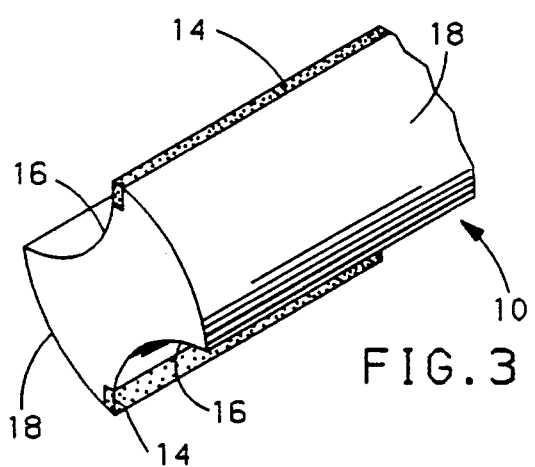
FIG. 3 is a view of the tool body after the flutes have been machined contiguous to the veins.
Figure 5:
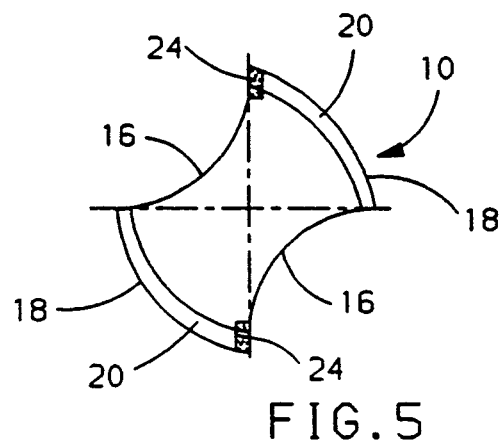
FIG. 5 is an end view of the completed tool.

Referring to FIGS. 3 and 5, the next step in the process is illustrated. A pair of diametrically opposed, axially extending flutes 16 are machined into the surface of body 10, each of which subtends an angle of approximately ninety degrees. This leaves a pair of arcuate lands 18, which are the remainder of the surface of body 10. Each flute 16 comprises a shallow curve, but is fairly flat along the parallel lines where it intersects each land 18. The flutes 16 are machined in the same fashion that they would be conventionally, but, unlike the conventional case, their location relative to the surface of body 10 is not arbitrary. Instead, each flute 16 is machined contiguous to a vein 14, so as to assure the exposure of one side of the vein 14 along one line of intersection of each flute 16 with a land 18. In addition, as seen in FIG. 5, when the veins 14 are oriented at the twelve and six o'clock position, the flutes 16 are located in the nine to twelve and the three to six o'clock quadrants. This is done because the direction of tool rotation will be counterclockwise, from the perspective of FIG. 5, and it is thereby assured that the proper side of the veins 14 is exposed.

Figure 4:
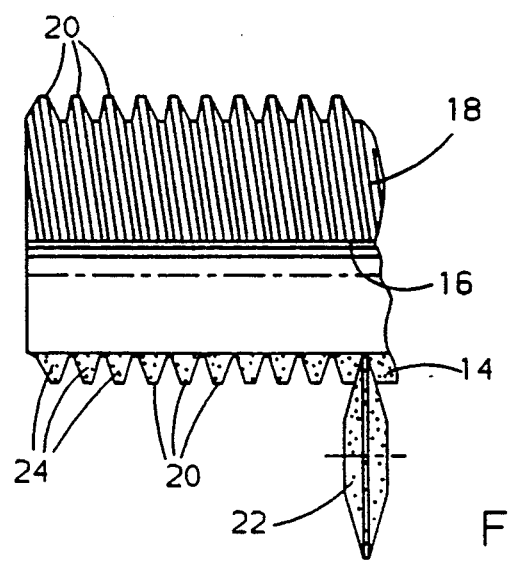
FIG. 4 shows the teeth being formed on the lands between the flutes.

Referring to FIGS. 4 and 5, the final step in the process is to machine a regular pattern of thread cutting teeth 20. Teeth 20 are ground by a conventional grinding wheel 22 across the lands 18, and are given the proper size, pitch and angle to eventually cut the thread pattern desired. Teeth 20 are ground conventionally, but the wheel 22 will simultaneously cut through the exposed side of the veins 14. Grinding wheel 22 may have to be made of a harder material itself, since it has to cut through the veins 14, or it may have to be dressed and changed more frequently. Because the veins 14 are cut through, it is assured that the leading edge of each tooth 20 will be comprised of the remainders 24 of the wear resistant material in the original vein 14. Each tooth 20 is, in effect, tipped or inserted, but this results automatically as the teeth 20 are formed. It is unnecessary to carry out any further grinding or attachment operations. The veins 14 are made as deep as the desired height of teeth 20, and as wide as necessary to adequately armor the leading edges of teeth 20.

Variations in the disclosed method could be made. If the flutes were greater in number, then the veins would be, as well. If helical flutes were to be used, the veins would be helical rather than straight. With harder and more durable wear resistant materials, the slots and veins could probably be made thinner, as a thinner layer tipping the teeth would suffice. Basically, the slots and veins are tailored to the shape and size of both the flutes and teeth, but the flutes and teeth can remain the same. Other means might be determined for filling and hardening the wear resistant material into the slots to create the veins, such as suitable adhesives.

Therefore, it will be understood that it is not intended to limit the invention to just the embodiment disclosed.

The embodiments of the invention in which an exclusive property or privilege is claimed are defined as follows:

1. A method of manufacturing a thread cutting tool from a generally cylindrical tool body, comprising the sequential steps of,
   cutting at least one slot into the surface of said tool body extending generally axially along said tool body,
   providing a hardened vein of wear resistant material in said slot,
   machining a flute into the surface of said tool body contiguous to said vein, thereby creating a land with said vein exposed at the intersection of said flute and land,
   cutting a plurality of teeth through said flute and exposed vein and across said land, thereby creating a leading edge on said teeth comprised of said wear resistant material.

2. A method of manufacturing a thread cutting tool from a generally cylindrical tool body, comprising the sequential steps of,
   cutting a pair of slots into the surface of said tool body extending generally axially along said tool body,
   providing a hardened vein of wear resistant material in each of said slots,
   machining a flute into the surface of said tool body contiguous to each of said veins, thereby creating a pair of lands with a respective vein exposed at the intersection of each flute and land,
   cutting a plurality of teeth through said flutes and exposed veins and across said lands, thereby creating a leading edge on said teeth comprised of said wear resistant material.

* * * * *